US008732485B2

(12) United States Patent
Kahler et al.

(10) Patent No.: US 8,732,485 B2
(45) Date of Patent: May 20, 2014

(54) METHODS FOR PROCESS KEY ROLLOVER/RE-ENCRYPTION AND SYSTEMS THEREOF

(75) Inventors: David R. Kahler, Tucson, AZ (US); Roderick G. C. Moore, Bournemouth (GB); Karl A. Nielsen, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 514 days.

(21) Appl. No.: 12/958,249

(22) Filed: Dec. 1, 2010

(65) Prior Publication Data
US 2012/0144209 A1 Jun. 7, 2012

(51) Int. Cl.
H04L 9/16 (2006.01)
G06F 12/14 (2006.01)
H04L 9/06 (2006.01)
G06F 13/00 (2006.01)

(52) U.S. Cl.
USPC ............ 713/193; 713/189; 711/114; 380/277

(58) Field of Classification Search
USPC .................................. 380/277; 713/189, 193
See application file for complete search history.

(56) References Cited

U.S. PATENT DOCUMENTS

| 5,574,882 | A * | 11/1996 | Menon et al. ................. 711/114 |
| 5,781,632 | A | 7/1998 | Odom |
| 6,236,727 | B1 | 5/2001 | Ciacelli et al. |
| 7,477,738 | B2 | 1/2009 | Rajamma |
| 7,490,248 | B1 | 2/2009 | Valfridsson et al. |
| 2006/0248307 | A1* | 11/2006 | Yamamoto et al. ........... 711/170 |
| 2007/0220316 | A1 | 9/2007 | Guha et al. |
| 2008/0091896 | A1* | 4/2008 | Usami ........................... 711/162 |
| 2008/0240428 | A1* | 10/2008 | Hobbet et al. ................... 380/45 |
| 2009/0319807 | A1 | 12/2009 | Chasen et al. |
| 2010/0088525 | A1* | 4/2010 | Ureche et al. ................. 713/193 |
| 2011/0038477 | A1* | 2/2011 | Bilodi ............................. 380/44 |
| 2011/0264925 | A1* | 10/2011 | Russo et al. .................. 713/193 |

FOREIGN PATENT DOCUMENTS

| CN | 11064812 A | 10/2007 |
| EP | 0914640 A1 | 5/1999 |
| EP | 2015214 A2 | 1/2009 |
| JP | 2007293872 A2 | 11/2007 |
| KR | 2000001101 | 2/2000 |

OTHER PUBLICATIONS

"Enterprise SED Presentation," by Trusted Computing Group, Sep. 2010, pp. 1-23, retrieved at: http://www.trustedcomputinggroup.org/files/resource_files/0B968DDB-1A4B-B294-D02FF4F402F72707/SWG_TCG_Enterprise%20Introduction_Sept2010.pdf.*

* cited by examiner

*Primary Examiner* — Beemnet Dada
*Assistant Examiner* — Kalish Bell
(74) *Attorney, Agent, or Firm* — Zilka-Kotab, PC

(57) ABSTRACT

A method according to one embodiment includes defining a new encryption band with a length that is consistent with a redundant array of inexpensive disks (RAID) parity strip; freeing a working extent in a working stride on the RAID. In an iterative process until each stride in a source band is depleted of data: marking a source extent in a source stride from which to gather data to be re-encrypted; marking parity inconsistent in the working stride in the new encryption band; performing a second iterative process; and freeing the working extent. The second iterative process is performed until each extent in a source stride is depleted of data. Additional systems, methods and computer program products are also presented.

20 Claims, 5 Drawing Sheets

METHODS FOR PROCESS KEY ROLLOVER/RE-ENCRYPTION AND SYSTEMS THEREOF

BACKGROUND

The present invention relates to data storage systems, and more particularly, this invention relates to key rollover/re-encryption of data in RAID arrays comprising self encrypting disk components.

Many times, when a large amount of data is to be stored to some storage media, a redundant array of inexpensive disks (RAID) is used to provide data protection and/or fault tolerance in case of failures, particularly disk failures, in a cost-effective solution. RAID also distributes data over multiple disks and performs parallel operations on these disks, thereby allowing for an increase in I/O performance.

RAID is generally described in six levels, which are referred to as level 1 to level 6. RAID level 1 includes one or more data disks for storing data and an equal number of mirror disks for storing copies of the data on the one or more data disks. RAID levels 2-6 store the data on the data disks in segments for storage across several disks. Additional disks are then provided to store error check or parity information of the data stored in segments across the data disks. The particular RAID levels are marked by their relative performance capabilities as well as their overhead storage requirements.

In some system architectures, particularly when sensitive data is being stored in RAID, more than data protection through redundant storage is desired. In these cases, encryption of the data may be desired. To address these situations, data may be encrypted prior to storing the data in the RAID, and/or the RAID may incorporate self-encrypting disk drives, which are capable of encrypting and storing data, thereby preventing or minimizing the chance that the data may be accessed by an unauthorized party.

However, in prior art systems which employ RAID, media encryption key rollover in an array of self encrypting drives has been problematic, since re-encryption of the data may not be provided by the self encrypting components of the RAID. Therefore, a method and/or system which allows for self encrypting disk drive technology to be used in RAID would be very beneficial to protecting data in a cost effective manner.

BRIEF SUMMARY

A method according to one embodiment of the present invention includes defining a new encryption band with a length that is consistent with a redundant array of inexpensive disks (RAID) parity strip; freeing a working extent in a working stride on the RAID. In an iterative process until each stride in a source band is depleted of data: marking a source extent in a source stride from which to gather data to be re-encrypted; marking parity inconsistent in the working stride in the new encryption band; performing a second iterative process; and freeing the working extent. The second iterative process is performed until each extent in a source stride is depleted of data, the second iterative process including: copying the source extent from the source stride to the working extent in the working stride; marking parity consistent in the working stride; assigning the source extent in the source stride as a target extent in a target stride; shrinking the source band from which the source extent was copied by an amount related to an amount of data copied from the source stride to the working stride; expanding the new encryption band by an amount related to the amount of data that has been copied from the source stride to the working stride; copying all data from the working extent to the target extent; marking parity consistent in the target stride; and marking parity inconsistent in the working stride.

A method according to another embodiment includes staging a parity stride from a source array in a redundant array of inexpensive disks (RAID); storing the parity stride from the source array to a non-volatile memory; and performing an iterative process until the source array is depleted of data, the iterative process including: defining a new encryption band with a length that is consistent with a RAID parity strip; marking a source extent in the source array from which to gather data to be re-encrypted; marking the RAID parity strip free on the source extent; applying the new encryption band to each array component in the parity strip; and moving each data band from the source extent in the source array to the non-volatile memory. The method further includes deleting the source extent after being depleted of data; destaging the parity stride; and freeing the non-volatile memory for use by other operations.

A computer program product for re-encrypting data according to one embodiment includes a computer readable storage medium having computer readable program code embodied therewith, the computer readable program code comprising: computer readable program code configured to define a new encryption band with a length that is consistent with a redundant array of inexpensive disks (RAID) parity strip; computer readable program code configured to free a working extent in a working stride on the RAID; computer readable program code configured to mark a source extent in a source stride from which to gather data to be re-encrypted; computer readable program code configured to mark parity inconsistent in the working stride in the new encryption band; computer readable program code configured to copy the source extent from the source stride to the working extent in the working stride; computer readable program code configured to mark parity consistent in the working stride; computer readable program code configured to assign the source extent in the source stride as a target extent in a target stride; computer readable program code configured to shrink the source band from which the source extent was copied by an amount related to an amount of data copied from the source stride to the working stride; computer readable program code configured to expand the new encryption band by an amount related to the amount of data that has been copied from the source stride to the working stride; computer readable program code configured to copy all data from the working extent to the target extent; computer readable program code configured to mark parity consistent in the target stride; computer readable program code configured to mark parity inconsistent in the working stride; and computer readable program code configured to free the working extent.

A system according to one embodiment includes logic adapted for defining a new encryption band with a length that is consistent with a redundant array of inexpensive disks (RAID) parity strip; logic adapted for freeing a working extent in a working stride on the RAID; logic adapted for marking a source extent in a source stride from which to gather data to be re-encrypted; logic adapted for marking parity inconsistent in the working stride in the new encryption band; logic adapted for copying the source extent to the working extent in the working stride; logic adapted for marking parity consistent in the working stride; logic adapted for assigning the source extent as a target extent in a target stride; logic adapted for shrinking the source band from which the source extent was copied by an amount related to an amount of data copied from the source stride to the working stride;

logic adapted for expanding the new encryption band by an amount related to the amount of data that has been copied from the source stride to the working stride; logic adapted for copying all data from the working extent to the target extent; logic adapted for marking parity consistent in the target stride; logic adapted for marking parity inconsistent in the working stride; and logic adapted for freeing the working extent.

Other aspects and embodiments of the present invention will become apparent from the following detailed description, which, when taken in conjunction with the drawings, illustrate by way of example the principles of the invention.

DETAILED DESCRIPTION

Figure 1:
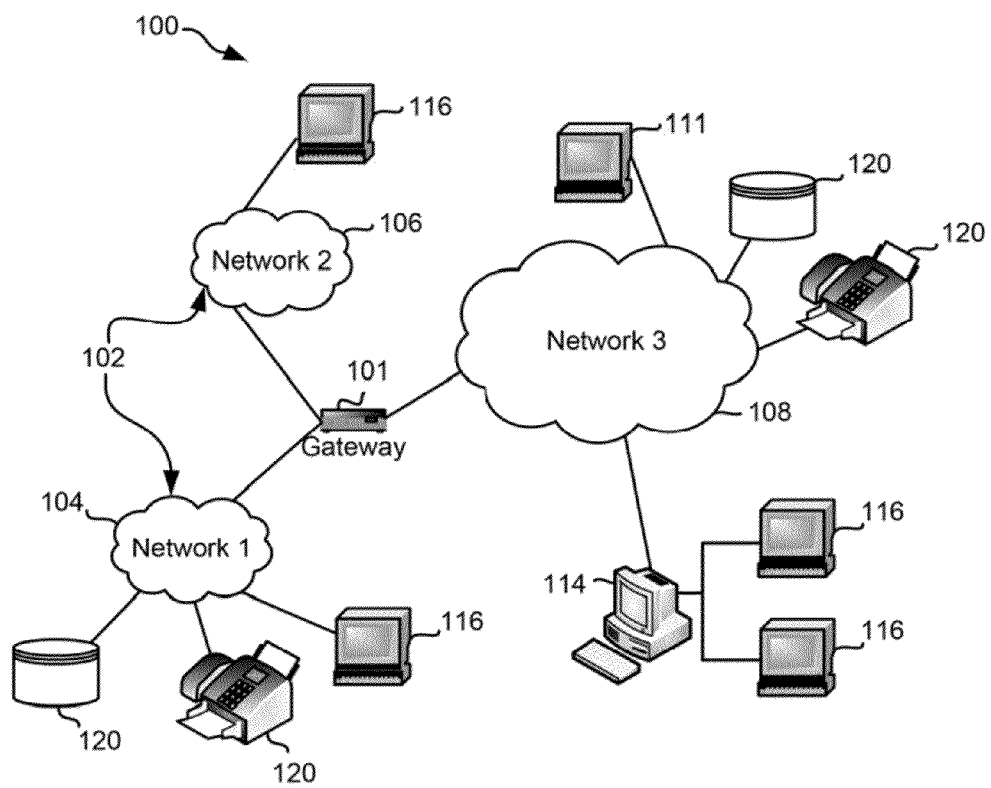
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems, particularly systems employing Redundant Array of Inexpensive Disks (RAID) with self encrypting disk drives, as well as operation and/or component parts thereof.

According to one embodiment, virtualization concepts (such as extents, etc.) may be integrated into a RAID constructed using disk drives having self encryption technology, such as bands, encryption keys, e.g., Trusted Computing Group (TCG) storage architecture core specification and Security Subsystem Class (SSC): Enterprise, etc., and strip based RAID parity algorithms to achieve a band algorithm to walk through each array in a coordinated fashion across components to achieve re-encryption of all data in the data band of a RAID, according to various embodiments.

In one general embodiment, a method includes defining a new encryption band with a length that is consistent with a redundant array of inexpensive disks (RAID) parity strip; freeing a working extent in a working stride on the RAID. In an iterative process until each stride in a source band is depleted of data: marking a source extent in a source stride from which to gather data to be re-encrypted; marking parity inconsistent in the working stride in the new encryption band; performing a second iterative process;'and freeing the working extent. The second iterative process is performed until each extent in a source stride is depleted of data, the second iterative process including: copying the source extent from the source stride to the working extent in the working stride; marking parity consistent in the working stride; assigning the source extent in the source stride as a target extent in a target stride; shrinking the source band from which the source extent was copied by an amount related to an amount of data copied from the source stride to the working stride; expanding the new encryption band by an amount related to the amount of data that has been copied from the source stride to the working stride; copying all data from the working extent to the target extent; marking parity consistent in the target stride; and marking parity inconsistent in the working stride.

In another general embodiment, a method includes staging a parity stride from a source array in a redundant array of inexpensive disks (RAID); storing the parity stride from the source array to a non-volatile memory; and performing an iterative process until the source array is depleted of data, the iterative process including: defining a new encryption band with a length that is consistent with a RAID parity strip; marking a source extent in the source array from which to gather data to be re-encrypted; marking the RAID parity strip free on the source extent; applying the new encryption band to each array component in the parity strip; and moving each data band from the source extent in the source array to the non-volatile memory. The method further includes deleting the source extent after being depleted of data; destaging the parity stride; and freeing the non-volatile memory for use by other operations.

In one general embodiment, a computer program product for re-encrypting data includes a computer readable storage medium having computer readable program code embodied therewith, the computer readable program code comprising: computer readable program code configured to define a new encryption band with a length that is consistent with a redundant array of inexpensive disks (RAID) parity strip; computer readable program code configured to free a working extent in a working stride on the RAID; computer readable program code configured to mark a source extent in a source stride from which to gather data to be re-encrypted; computer readable program code configured to mark parity inconsistent in the working stride in the new encryption band; computer readable program code configured to copy the source extent from the source stride to the working extent in the working stride; computer readable program code configured to mark parity consistent in the working stride; computer readable program code configured to assign the source extent in the source stride as a target extent in a target stride; computer readable program code configured to shrink the source band from which the source extent was copied by an amount related to an amount of data copied from the source stride to the working stride; computer readable program code configured to expand the new encryption band by an amount related to the amount of data that has been copied from the source stride to the working stride; computer readable program code configured to copy all data from the working extent to the target extent; computer readable program code configured to mark parity consistent in the target stride; computer readable program code configured to mark parity inconsistent in the working stride; and computer readable program code configured to free the working extent.

In one general embodiment, a system includes logic adapted for defining a new encryption band with a length that is consistent with a redundant array of inexpensive disks (RAID) parity strip; logic adapted for freeing a working extent in a working stride on the RAID; logic adapted for marking a source extent in a source stride from which to gather data to be re-encrypted; logic adapted for marking parity inconsistent in the working stride in the new encryption band; logic adapted for copying the source extent to the working extent in the working stride; logic adapted for marking parity consistent in the working stride; logic adapted for assigning the source extent as a target extent in a target stride; logic adapted for shrinking the source band from which the source extent was copied by an amount related to an amount of data copied from the source stride to the working stride; logic adapted for expanding the new encryption band by an amount related to the amount of data that has been copied from the source stride to the working stride; logic adapted for copying all data from the working extent to the target extent; logic adapted for marking parity consistent in the target stride; logic adapted for marking parity inconsistent in the working stride; and logic adapted for freeing the working extent.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. In the context of the present network architecture 100, the networks 104, 106 may each take any form including, but not limited to a LAN, a WAN such as the Internet, WLAN, PSTN, internal telephone network, etc.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
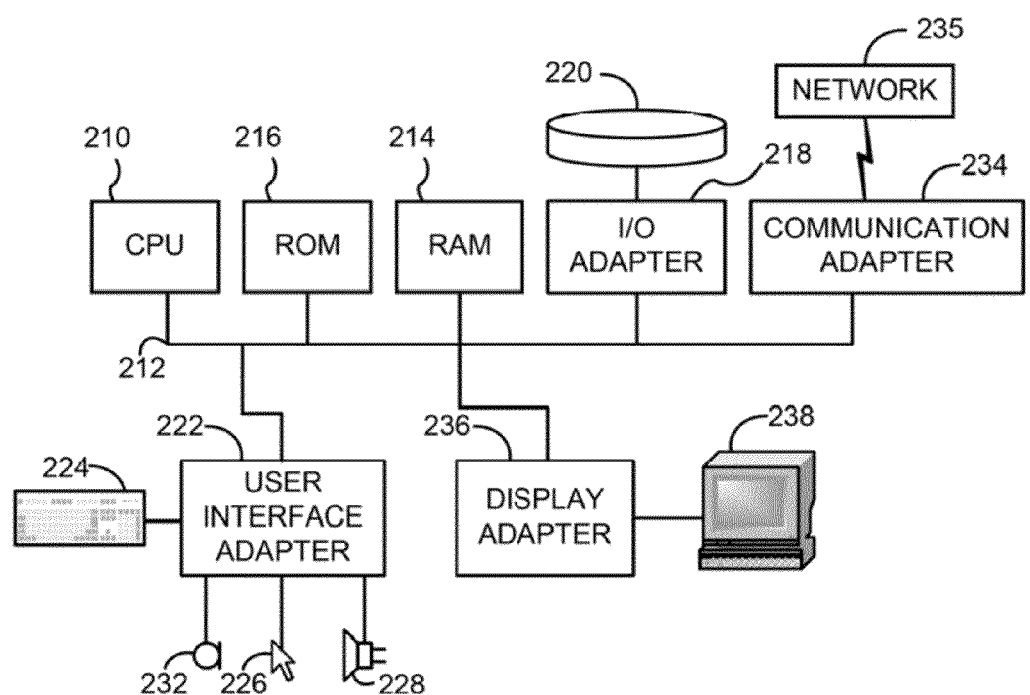
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

Standard I/T technologies are typically applicable to a centralized storage/server solution, such as RAID to provide a more reliable storage, Hierarchical Storage Management (HSM) to enable a lower cost (to both acquire and operate) solution, deduplicated storage, and deduplicated replication, according to one embodiment.

RAID techniques are broadly used in the I/T industry for both performance and reliability reasons. The simple fact is that most enterprises are not willing to accept the relatively poor performance and data reliability that individual inexpensive disks provide. Accordingly, they apply RAID techniques (described in more detail below) nearly pervasively; so much so in fact that use of RAID is often just inferred whenever data is stored to a disk array. As an example, another acronym, "Just a Bunch of Disks" (JBOD) has been coined to refer to the much less frequent situation where RAID is not used to protect a disk array. The implication is that if JBOD is not called out, then RAID is being used.

In a RAID, striping refers to writing (or reading) some data entity across multiple disks simultaneously to get higher performance—essentially the sum of the performance of the individual disks being striped. According to one embodiment, the RAID employed in the system may utilize striping.

In a RAID, error correction refers to a practice whereby redundant ("parity") data are stored to allow problems to be detected and possibly fixed (known as error correction or fault tolerance).

In a RAID, mirroring refers to writing identical data to two hard disk drives (HDDs) instead of one, and is the simplest form of redundancy. Mirroring is used to achieve high availability (HA) in servers (e.g., data is written to both disks, and second disk is read from if, and only if, the first disk fails).

In one embodiment, included RAID types include RAID-1 mirroring and RAID-5 striping. Relying on the redundancy provided by RAID, loss of any one failed disk may be tolerated by the system. The simplest form of RAID-5 calculation is via simple XOR which if applied across an odd set of identical inputs (data) will result in one more replica of the identical data.

According to one embodiment, in place re-encryption of data in a RAID may be accomplished by using an N+1 band and extent migration. Media encryption key rollover in an array constructed from self encrypting drive technology may be used to accomplish the in-place re-encryption, according to one approach.

Some terms used herein include: extent, which is a range of data that starts and ends on a strip boundary; stride, which is a parity stride on a RAID; target extent (TargetExtent), which is a working extent to which data moves during an encryption key rollover; and source extent (SourceExtent), which is an extent from which the data is moved from during an encryption key rollover.

In one example, assume disks in a RAID are configured with two bands, a first large band (data band) having data residing therein encrypted, and a second band. According to one approach, a third band (re-encryption band) may be applied, possibly using TCG technology, and is moved through the disk on RAID strip boundaries, iteratively shrinking the data band while growing the re-encryption band, while migrating an extent into the re-encryption space.

The exemplary method described above allows for data preserving re-encryption to occur using existing self encrypting drive technology while maintaining RAID redundancy for data. The method combines extent models with the band technology of self encrypting drives, and well known stripwise RAID algorithms to change media encryption keys for all components of a RAID.

Figure 3:
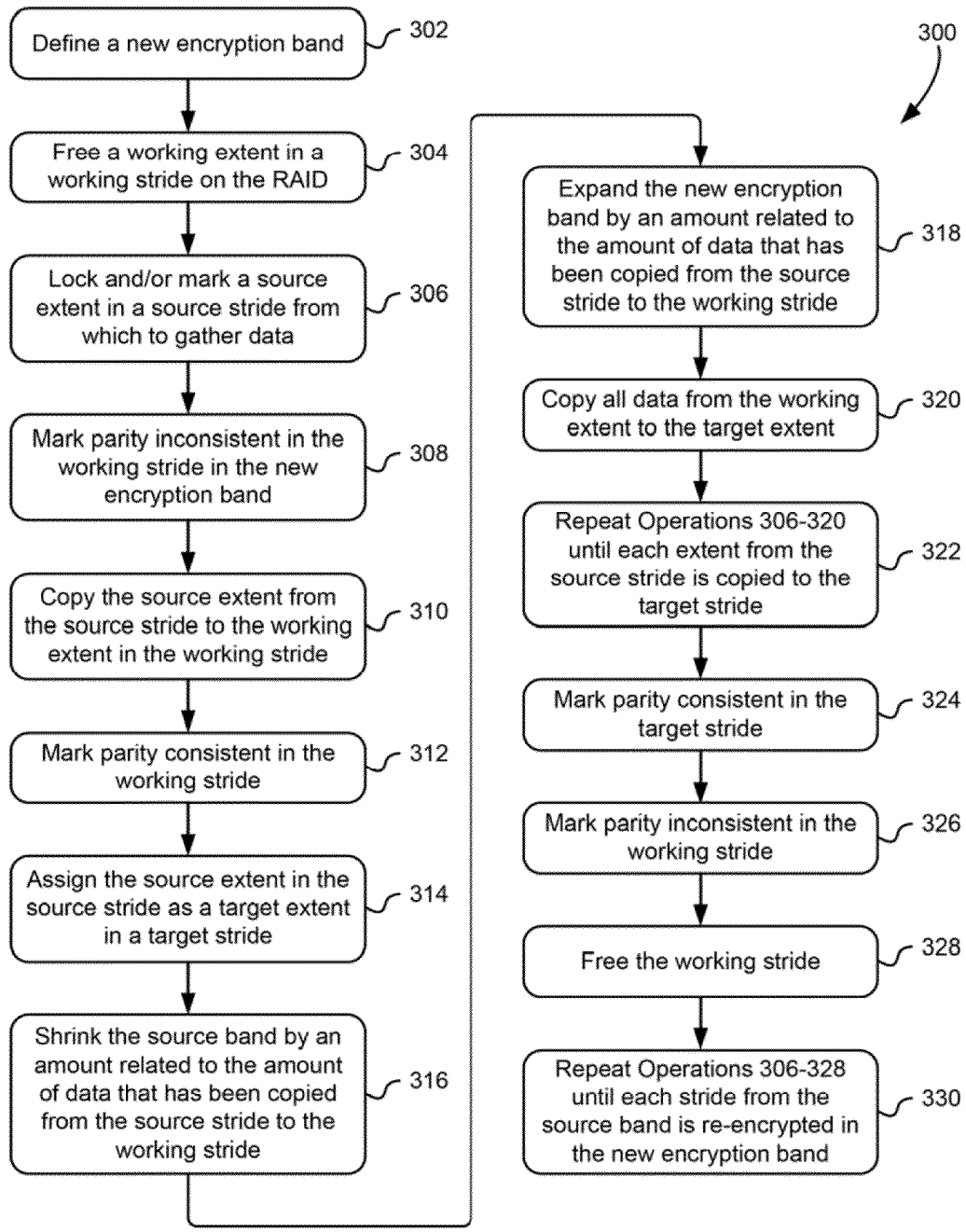
FIG. 3 shows a method according to one embodiment.

Now referring to FIG. 3, a method 300 is shown according to one embodiment. The method 300 may be carried out in any desired environment, including those described in FIGS. 1-2.

In operation 302, a new encryption band is defined, referred to herein as band N', with a length that is consistent with a RAID parity strip.

In operation 304, a working extent in a working stride is freed on the RAID at a starting point. Any starting point may be used, such as LBA 0 on the RAID, etc.

In operation 306, a source extent in a source stride, both of which are on a source band, referred to as source band N, is locked and/or marked, and may preferably be the next extent on the RAID. By next, what is meant is that the source extent is available in a free pool of the RAID and is capable of being written to, and is the next logical extent in the RAID structure.

In operation 308, parity is marked inconsistent in the working stride in the new encryption band.

In operation 310, the source extent is copied from the source stride to the working extent in the working stride.

In operation 312, parity is marked consistent in the working stride.

In operation 314, the source extent in the source stride is assigned as a target extent in a target stride.

In operation 316, the source band N is shrunk by an amount related to an amount of data copied from the source stride to the working stride.

In operation 318, the new encryption band N' is expanded by an amount related to the amount of data that has been copied from the source stride to the working stride.

In operation 320, all data is copied from the working extent to the target extent.

In operation 322, operations 306-320 are repeated until each extent from the source stride is copied to the target stride.

In operation 324, parity is marked consistent in the target stride.

In operation 326, parity is marked inconsistent in the working stride.

In operation 328, the working extent is freed, so that, as shown in operation 330, operations 306-326 may be repeated until each stride from the source band N is re-encrypted in the new encryption band N', e.g., each source stride in the source band N has been depleted of data.

For example, after the source stride has been depleted of data, the next extent in the next stride is chosen, e.g., moving 'up' the array to the next extent, and a new source stride and working stride are designated. Then, the copying from the source stride to the working stride may be performed as previously described.

Figure 4:
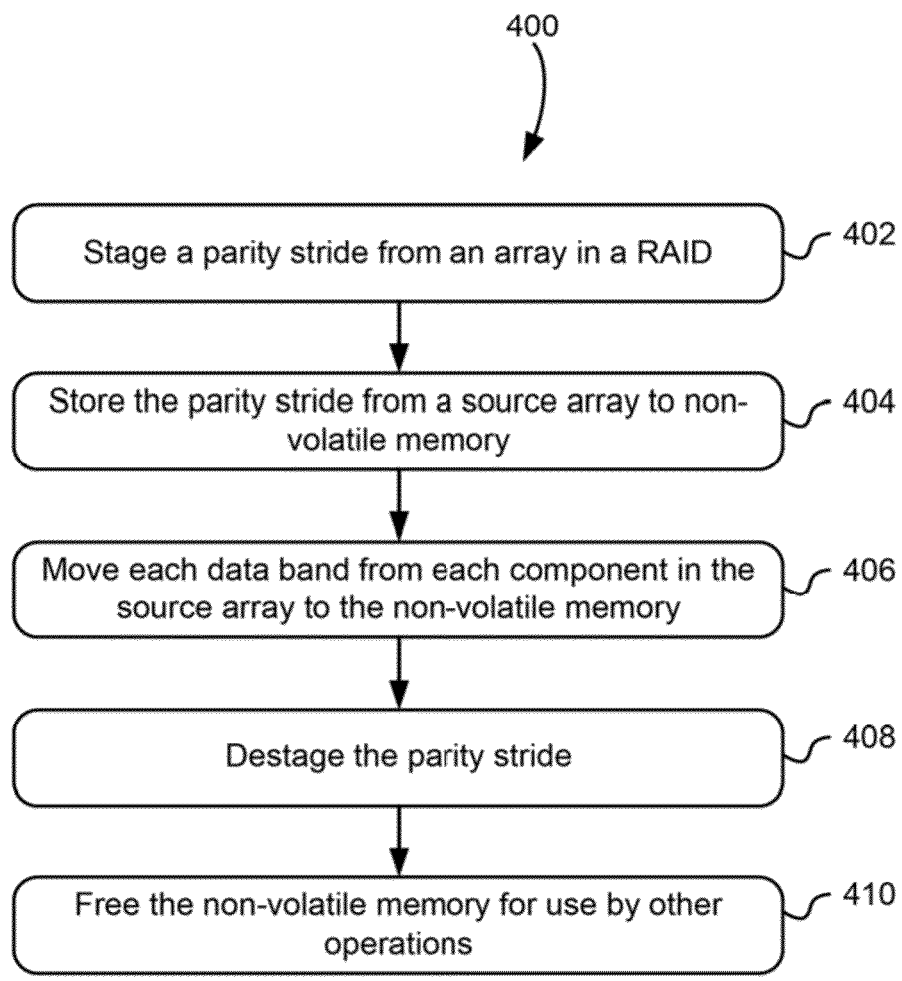
FIG. 4 shows a method according to one embodiment.

Now referring to FIG. 4, a method 400 is shown according to one embodiment. The method 400 may be carried out in any desired environment, including those described in FIGS. 1-2.

In operation 402, a parity stride is staged from an array in a RAID.

In operation 404, the parity stride from a source array is stored to non-volatile memory.

In operation 406, each data band from each component in the source array is moved to the non-volatile memory.

In operation 408, the parity stride is destaged.

In operation 410, the non-volatile memory is freed for use by other operations.

This embodiment allows the data to be moved and re-encrypted without using an extent on the array, and also reduces data movement.

The methods 300 and 400 are both consistent with the Enterprise SSC and current self encrypting drive technologies available on the market.

A computer program product may include any of the embodiments and approaches described above, as would be known to one of skill in the art. The computer program product may include a computer readable storage medium having computer readable program code embodied therewith.

Figure 5:
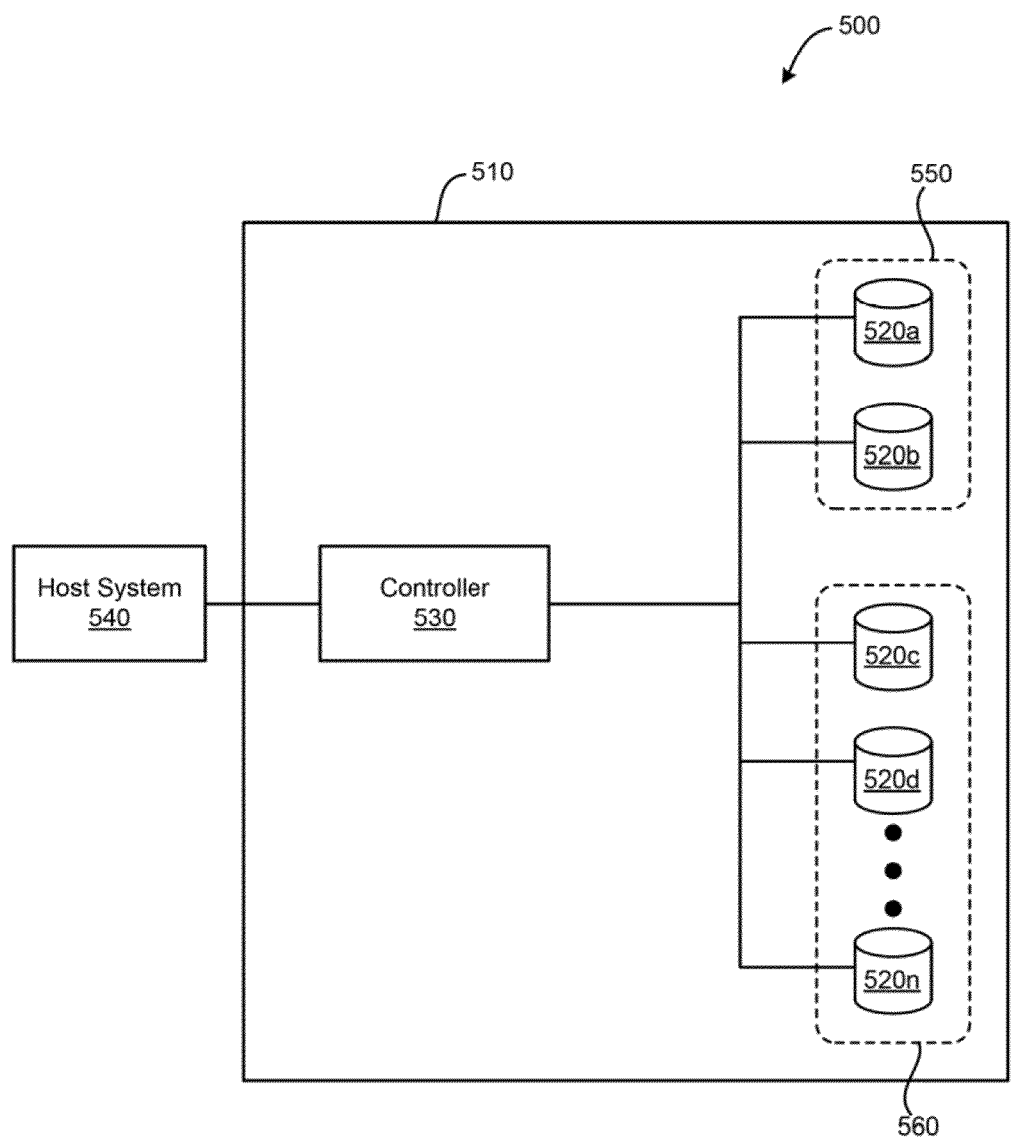
FIG. 5 shows a system according to one embodiment.

Now referring to FIG. 5, in another embodiment, a system 500 may include logic adapted for performing all or some of the above described embodiments and approaches. For example, a system 500 may include one or more RAIDs 550, 560, and each RAID may comprise one or more random access storage media 520a, 520b, . . . , 520n, such as hard disk drives. The one or more RAIDS 550, 560 may be connected to a controller 530 for controlling some or all operations of the individual media 520a, 520b, . . . , 520n. The storage system 510 may be connected to, or receive instructions and/or data from, a host system 540. Either in the host system 540, the storage system 510, the controller 530, or some other component, there may be logic adapted for freeing a working extent of an array in a RAID 550, 560, logic adapted for defining a new encryption band with a length that is consistent with a RAID parity strip, logic adapted for marking a source extent in the array from which to gather data to be re-encrypted, logic adapted for marking the RAID parity strip free on the source extent, logic adapted for applying the new encryption band to each array component in the parity strip until each extent in an array is depleted of data, logic adapted for copying data in a single parity strip from the source extent to a target extent, logic adapted for marking a next parity stride inconsistent on the source extent, logic adapted for shrinking a band from which the source extent was copied by an amount related to an amount of data that has been copied from the source extent to the target extent, logic adapted for expanding the new encryption band by an amount related to the amount of data that has been copied from the source extent to the target extent until the source extent is depleted of data, logic adapted for deleting the source extent after being depleted of data, and logic adapted for returning the working extent to a free pool of the array. Of course, other logic may be available as would be understood by one of ordinary skill in the art upon reading the present descriptions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:

defining a new encryption band with a length that is consistent with a redundant array of inexpensive disks (RAID) parity strip;

freeing a working extent in a working stride on the RAID;

in an iterative process until each stride in a source band is depleted of data:

marking a source extent in a source stride from which to gather data to be re-encrypted;

marking parity inconsistent in the working stride in the new encryption band;

in a second iterative process until each extent in a source stride is depleted of data:

copying the source extent from the source stride to the working extent in the working stride;

marking parity consistent in the working stride;

assigning the source extent in the source stride as a target extent in a target stride;

shrinking the source band from which the source extent was copied by an amount related to an amount of data copied from the source stride to the working stride;

expanding the new encryption band by an amount related to the amount of data that has been copied from the source stride to the working stride;

copying all data from the working extent to the target extent;

marking parity consistent in the target stride; and marking parity inconsistent in the working stride; and freeing the working extent.

2. The method as recited in claim 1, wherein the working extent is freed at a starting point.

3. The method as recited in claim 1, wherein the source band is shrunk and the new encryption band is expanded over a plurality of iterations while the data in the source stride is migrated to the working stride.

4. The method as recited in claim 1, wherein the source extent is a next extent on the RAID.

5. The method as recited in claim 1, wherein marking the source extent in the source stride includes locking the source extent such that operations may not be performed on the source extent during re-encryption.

6. A method, comprising:

staging a parity stride from a source array in a redundant array of inexpensive disks (RAID);

storing the parity stride from the source array to a non-volatile memory;

in an iterative process until the source array is depleted of data:

defining a new encryption band with a length that is consistent with a RAID parity strip;

marking a source extent in the source array from which to gather data to be re-encrypted;

marking the RAID parity strip free on the source extent;

applying the new encryption band to each array component in the parity strip; and moving each data band from the source extent in the source array to the non-volatile memory;

deleting the source extent after being depleted of data;

destaging the parity stride; and freeing the non-volatile memory for use by other operations.

7. The method as recited in claim 6, wherein the source band is shrunk and the new encryption band is expanded over a plurality of iterations while the data in the source stride is migrated to the working stride.

8. The method as recited in claim 6, wherein marking the source extent includes locking the source extent such that operations may not be performed on the source extent during re-encryption.

9. A computer program product for re-encrypting data, the computer program product comprising:

a non-transitory computer readable storage medium having computer readable program code embodied therewith, the computer readable program code comprising:

computer readable program code configured to define a new encryption band with a length that is consistent with a redundant array of inexpensive disks (RAID) parity strip;

computer readable program code configured to free a working extent in a working stride on the RAID;

computer readable program code configured to mark a source extent in a source stride from which to gather data to be re-encrypted;

computer readable program code configured to mark parity inconsistent in the working stride in the new encryption band;

computer readable program code configured to copy the source extent from the source stride to the working extent in the working stride;

computer readable program code configured to mark parity consistent in the working stride;

computer readable program code configured to assign the source extent in the source stride as a target extent in a target stride;

computer readable program code configured to shrink the source band from which the source extent was copied by an amount related to an amount of data copied from the source stride to the working stride;

computer readable program code configured to expand the new encryption band by an amount related to the amount of data that has been copied from the source stride to the working stride;

computer readable program code configured to copy all data from the working extent to the target extent;

computer readable program code configured to mark parity consistent in the target stride;

computer readable program code configured to mark parity inconsistent in the working stride; and computer readable program code configured to free the working extent.

10. The computer program product as recited in claim 9, wherein the working extent is freed at a starting point.

11. The computer program product as recited in claim 9, wherein the source band is shrunk and the new encryption band is expanded over a plurality of iterations while the data in the source stride is migrated to the working stride.

12. The computer program product as recited in claim 9, wherein the source extent is a next extent on the RAID.

13. The computer program product as recited in claim 9, wherein marking the source extent in the source stride includes locking the source extent such that operations may not be performed on the source extent during re-encryption.

14. A system, comprising:

a hardware processor adapted for executing logic;

logic adapted for defining a new encryption band in a redundant array of inexpensive disks (RAID) with a length that is consistent with a parity strip of the RAID;

logic adapted for freeing a working extent in a working stride on the RAID;

logic adapted for marking a source extent in a source stride on the RAID from which to gather data to be re-encrypted;

logic adapted for marking parity inconsistent in the working stride in the new encryption band;

logic adapted for copying the source extent to the working extent in the working stride;

logic adapted for marking parity consistent in the working stride;

logic adapted for assigning the source extent as a target extent in a target stride on the RAID;

logic adapted for iteratively copying portions of data from the working extent to the target extent until all of the data from the working extend has been copied to the target extent by multiple iterations of shrinking the source band from which the source extent was copied by an amount of data copied from the source stride to the working stride in a single iteration, while expanding the new encryption band by about a same amount;

logic adapted for marking parity consistent in the target stride;

logic adapted for marking parity inconsistent in the working stride; and logic adapted for freeing the working extent.

15. The system as recited in claim 14, wherein the working extent is freed at a starting point.

16. The system as recited in claim 15, wherein the starting point is LBA 0.

17. The system as recited in claim 14, wherein the source extent is a next extent on the RAID.

18. The system as recited in claim 14, wherein the logic adapted for marking the source extent in the source stride includes logic adapted for locking the source extent such that operations may not be performed on the source extent during re-encryption.

19. The method as recited in claim 1, wherein the RAID comprises self-encrypting drives, and further comprising maintaining RAID redundancy for data in each stride in the source band.

20. The method as recited in claim 1, wherein each extent is a range of data that starts and ends on a strip boundary.

* * * * *